(12) United States Patent
Mhetar et al.

(10) Patent No.: US 10,332,658 B2
(45) Date of Patent: Jun. 25, 2019

(54) METHOD OF FORMING A COATED OVERHEAD CONDUCTOR

(71) Applicants: GENERAL CABLE TECHNOLOGIES CORPORATION, Highland Heights, KY (US); Emisshield, Inc., Blacksburg, VA (US)

(72) Inventors: Vijay Mhetar, Carmel, IN (US); Cody R. Davis, Maineville, OH (US); Sathish Kumar Ranganathan, Avon, IN (US); John Olver, Blacksburg, VA (US); John Dillard, New Castle, VA (US)

(73) Assignees: General Cable Technologies Corporation, Highland Heights, KY (US); Emisshield, Inc., Blacksburg, VA (US)

( * ) Notice: Subject to any disclaimer, the term of this patent is extended or adjusted under 35 U.S.C. 154(b) by 40 days.

(21) Appl. No.: 15/230,194

(22) Filed: Aug. 5, 2016

(65) Prior Publication Data
US 2016/0343476 A1    Nov. 24, 2016

Related U.S. Application Data

(63) Continuation of application No. 14/051,080, filed on Oct. 10, 2013, now abandoned.

(51) Int. Cl.
*H01B 13/16* (2006.01)
*H01B 7/29* (2006.01)
(Continued)

(52) U.S. Cl.
CPC ............ *H01B 13/165* (2013.01); *B05D 7/20* (2013.01); *B24C 1/00* (2013.01); *H01B 1/023* (2013.01);
(Continued)

(58) Field of Classification Search
CPC ...... H01B 13/165; H01B 1/023; H01B 1/026; H01B 3/003; H01B 7/29; B24C 1/00;
(Continued)

(56) References Cited

U.S. PATENT DOCUMENTS 2,699,425 A * 1/1955 Nieter .................... H05K 3/108
101/129
3,404,031 A * 10/1968 Clayton ................ C04B 41/009
252/500
(Continued)

FOREIGN PATENT DOCUMENTS

CN        200979826 Y     11/2007
CN        101572137 A     11/2009
(Continued)

OTHER PUBLICATIONS

Kim, Tae Hoon; International Search Report and Written Opinion of the International Searching Authority, issued in International Application No. PCT/US2013/070154; dated Jul. 17, 2014; 11 pages.
(Continued)

*Primary Examiner* — Brian K Talbot
(74) *Attorney, Agent, or Firm* — Ulmer & Berne LLP

(57) ABSTRACT

The present invention relates to a surface modified overhead conductor with a coating that allows the conductor to operate at lower temperatures. The coating contains about 5% to about 30% of an inorganic adhesive, about 45% to about 92% of a filler, about 2% to about 20% of one or more emissivity agents, and about 1% to about 5% of a stabilizer.

17 Claims, 5 Drawing Sheets

(51) Int. Cl.

| | | |
|---|---|---|
| *B05D 7/20* | (2006.01) | |
| *H01B 1/02* | (2006.01) | |
| *H01B 3/00* | (2006.01) | |
| *B24C 1/00* | (2006.01) | |
| *H02G 7/00* | (2006.01) | |
| *B05D 1/30* | (2006.01) | |
| *B05D 3/00* | (2006.01) | |
| *B05D 1/02* | (2006.01) | |
| *B05D 3/08* | (2006.01) | |
| *B05D 1/08* | (2006.01) | |
| *B05D 3/12* | (2006.01) | |
| *B05D 5/12* | (2006.01) | |

(52) U.S. Cl.
CPC ............ *H01B 1/026* (2013.01); *H01B 3/002* (2013.01); *H01B 7/29* (2013.01); *H02G 7/00* (2013.01); *B05D 1/02* (2013.01); *B05D 1/08* (2013.01); *B05D 1/30* (2013.01); *B05D 3/002* (2013.01); *B05D 3/08* (2013.01); *B05D 3/12* (2013.01); *B05D 5/12* (2013.01); *Y10T 428/292* (2015.01); *Y10T 428/294* (2015.01); *Y10T 428/2916* (2015.01); *Y10T 428/2958* (2015.01)

(58) Field of Classification Search
CPC ... H02G 7/00; B05D 1/02; B05D 1/08; B05D 1/30; B05D 3/002; B05D 3/08; B05D 3/12; B05D 5/12; B05D 7/20
USPC .................................................. 427/58, 117
See application file for complete search history.

(56) References Cited

U.S. PATENT DOCUMENTS

| | | | | |
|---|---|---|---|---|
| 4,588,546 | A * | 5/1986 | Feil | B29C 47/0016 156/244.12 |
| 4,741,130 | A * | 5/1988 | Tano | B24C 3/22 451/38 |
| 5,296,288 | A | 3/1994 | Kourtides et al. | |
| 5,391,606 | A | 2/1995 | Doles | |
| 5,828,007 | A | 10/1998 | Fujishita et al. | |
| 6,007,873 | A | 12/1999 | Holcombe, Jr. et al. | |
| 6,513,238 | B1 * | 2/2003 | Schlegel | F16C 7/023 29/888.09 |
| 6,921,431 | B2 | 7/2005 | Evans et al. | |
| 7,015,395 | B2 | 3/2006 | Goldsworthy et al. | |
| 7,105,047 | B2 | 9/2006 | Simmons et al. | |
| 7,438,971 | B2 | 10/2008 | Bryant et al. | |
| 7,752,754 | B2 | 7/2010 | Goldsworthy et al. | |
| 9,011,791 | B2 | 4/2015 | Olver et al. | |
| 2006/0156958 | A1 * | 7/2006 | Simmons | C04B 28/00 106/600 |
| 2010/0076719 | A1 | 3/2010 | Lawry et al. | |
| 2012/0074122 | A1 | 3/2012 | Olver et al. | |
| 2014/0041925 | A1 * | 2/2014 | Davis | H01B 7/29 174/40 R |

FOREIGN PATENT DOCUMENTS

| | | | | |
|---|---|---|---|---|
| CN | | 201773611 U | 3/2011 | |
| CN | | 202741376 U | 2/2013 | |
| DE | | 3824608 C1 | 8/1989 | |
| FR | | 2971617 A1 | 8/2012 | |
| RU | | 2386183 C1 | 4/2010 | |
| TW | | 201020550 A1 | 6/2010 | |
| TW | | 201220451 A | 5/2012 | |
| WO | | 2005005680 A2 | 1/2005 | |
| WO | WO 2005/005680 | * | 1/2005 | |
| WO | | 2007034248 A1 | 3/2007 | |
| WO | WO 2007/034248 | * | 3/2007 | ............ H01B 5/00 |
| WO | | 2009126593 A2 | 10/2009 | |

OTHER PUBLICATIONS

Lehnert, Andreas; Extended European Search Report for European App. No. 13895379.9, including supplementary European search report and European search opinion; dated Apr. 18, 2017; 6 pages.

Qing, Ge; First Office Action issued in Chinese Patent Application No. 201380081526.0; dated Jan. 26, 2017; 19 pages, including English translation.

Office Action of the Intellectual Property Office, issued in Taiwanese Patent Application No. 102138287; dated Aug. 15, 2017; 17 pages, including English translation.

Siyuan, Sun; Third Office Action issued in Chinese Patent Application No. 201380081526.0; dated Jul. 2, 2018; 15 pages, including English translation.

Nieva, Miguel Haiek; Office Action issued in Argentine Patent Application No. 20130103862; dated Oct. 22, 2018; 8 pages, including partial English translation.

* cited by examiner

METHOD OF FORMING A COATED OVERHEAD CONDUCTOR

CROSS REFERENCE TO RELATED APPLICATIONS

This application claims the priority benefit and is a continuation of U.S. patent application Ser. No. 14/051,080, entitled "COATED OVERHEAD CONDUCTOR", filed Oct. 10, 2013, and incorporates the same application by reference.

FIELD OF THE INVENTION

The present invention relates to a surface modified overhead conductor with a coating that allows the conductor to operate at lower temperatures.

BACKGROUND OF THE INVENTION

As the need for electricity continues to grow, the need for higher capacity transmission and distribution lines grows as well. The amount of power a transmission line can deliver is dependent on the current-carrying capacity (ampacity) of the line. The ampacity of a line is limited by the maximum safe operating temperature of the bare conductor that carries the current. Exceeding this temperature can result in damage to the conductor or the accessories of the line. Moreover, the conductor gets heated by Ohmic losses and solar heat and it gets cooled by conduction, convection and radiation. The amount of heat generated due to Ohmic losses depends on current (I) passing through it and its electrical resistance (R) by the relationship Ohmic losses=$I^2R$. Electrical resistance (R) itself is dependent on temperature. Higher current and temperature leads to higher electrical resistance, which, in turn, leads to more electrical losses in the conductor.

Several solutions have been proposed in the art. WO 2007/034248 to Simic discloses overhead conductors coated with a spectrally selective surface coating. The coating has a coefficient of heat emission (E) higher than 0.7 and coefficient of solar absorption (A) that is less than 0.3. Simic also requires that the surface be white in color to have low solar absorption.

DE 3824608 discloses an overhead cable having a black paint coating with an emissivity greater than 0.6, preferably greater than 0.9. The paint is made of a plastic (e.g. polyurethane) and black color pigment.

FR 2971617 discloses an electric conductor coated with a polymeric layer whose emissivity coefficient is 0.7 or more and solar absorption coefficient is 0.3 or less. The polymeric layer is produced from polyvinylidene fluoride (PVDF) and a white pigment additive.

Both FR 2971617 and WO 2007/034248 require white coatings that are not desirable due to glare and discoloration over time. Both DE 3824608 and FR 2971617 require polymeric coatings that are not desirable due to their questionable heat and wet aging characteristics.

US 20120074122 Al teaches the application of high emissivity coatings, such as those found in U.S. Pat. No. 7,105,047 and U.S. Pat. No. 6,921,431, on or adjacent to heating elements within a baking oven to modify the radiating heat. Those application and patents are incorporated herein by reference.

Therefore, there remains a need for a durable, inorganic, non-white coating for overhead conductors that allow the conductors to operate at reduced temperatures.

SUMMARY OF THE INVENTION

The temperature of the conductor is dependent on a number of factors including the electrical properties of the conductor, the physical properties of the conductor, and the local weather conditions. One way the conductor will increase in temperature is by absorbing heat from the sun due to solar radiation. The amount of heat absorbed is dependent on the surface of the conductor, that is, the surface's coefficient of absorptivity ("absorptivity"). A low absorptivity indicates that the conductor absorbs only a small amount of heat due to solar radiation.

One way the conductor reduces temperature is by emitting heat through radiation. The amount of heat radiated is dependent on the conductor surface's coefficient of emissivity ("emissivity"). The high emissivity indicates that the conductor is radiating more heat than a conductor with low emissivity.

Accordingly, it is an object of the present invention to provide an overhead conductor that contains an emissivity agent, when tested in accordance to ANSI C119.4-2004, reduces the operating temperature of the conductor compared to the temperature of the same conductor without the emissivity agent. The emissivity agent can be incorporated directly into the conductor or coated on the conductor. Preferably, the operating temperature is reduced by at least 5° C.

The overhead conductor, according to various embodiments of the present invention, has its surface exposed to the environment coated with a layer consisting of a high emissivity coating, such as those available from Emisshield, Inc. (Blacksburg, Va.), disposed on the exposed surface which alters the performance of the conductor surface. The coating layer contains about 5% to about 30% of an inorganic adhesive, about 45% to about 92% of a filler, about 2% to about 20% of one or more emissivity agents, and optionally, about 1% to about 5% of a stabilizer. The coating provides superior adhesion and flexibility on the conductor, such that it is able to resist peeling and cracking during repeated bending of the cable.

In a preferred embodiment of the present invention, the conductor coating layer contains, in dry weight, about 10% to about 25% sodium silicate, about 55% to about 75% $SiO_2$ dry powder, about 10% to about 25% $B_4C$, optionally about 0.5% to about 5.0% boron nitride dry weight, and about 0.5% to about 2% bentonite powder. The dry composition can be prepared as a wet mixture by adding about 20% to about 40% deionized water on a wet basis.

In a most preferred embodiment of the present invention, the coating used contains, as dry weight percent, about 13% to about 15% sodium silicate, about 69% $SiO_2$ dry powder, about 14% to about 16% boron carbide, and about 1.0% to about 1.5% bentonite powder. That dry composition can be prepared as a wet aqueous mixture having about 36% to about 38% deionized water on a wet basis.

In another most preferred embodiment of the present invention, the coating used contains, as dry weight percent, about 13% to about 15% sodium silicate, about 69% $SiO_2$ dry powder, about 13% to about 15% boron carbide dry weight, about 1.0% to about 2.0% boron nitride dry weight, and about 1.0% to about 1.5% bentonite powder. That dry composition can be prepared as a wet aqueous mixture having about 36% to about 38% deionized water on a wet basis.

A yet further object of the present invention provides methods for coating an overhead conductor with an inorganic, flexible coating that reduces the operating temperature of the conductor compared to the temperature of the same conductor without the heat radiating agent.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DETAILED DESCRIPTION OF THE PREFERRED EMBODIMENTS

Figure 1:
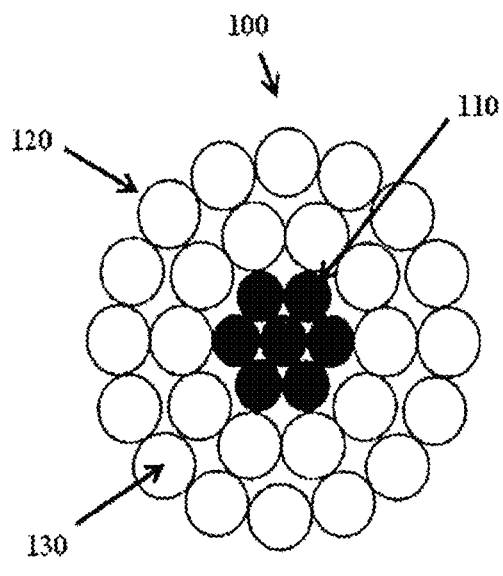
FIG. 1 is a cross sectional view of a conductor in accordance with one embodiment of the present invention.

The present invention provides an overhead conductor that contains an outer coating that, when tested in accordance to ANSI C119.4-2004, reduces the operating temperature of the conductor compared to the temperature of the same conductor without the heat radiating agent. The heat radiating agent can be incorporated directly into the conductor or coated on the conductor. Preferably, the operating temperature is reduced by at least 5° C.

In an embodiment, the present invention provides a bare overhead conductor with a surface coating to decrease the operating temperature of the conductor without significant change to any electrical or mechanical properties, such as electrical resistance, heat aging resistance, corona, elongation at rupture, tensile strength, and modulus of elasticity for example. The coating layer of the present invention contains about 5% to about 30%, preferably about 13% to about 15%, of an inorganic adhesive, about 45% to about 92%, preferably about 68% to about 69%, of a filler, about 2% to about 20%, preferably about 14% to about 17%, of one or more emissivity agents, and optionally, about 1% to about 5%, preferably about 1% to about 1.5%, of a stabilizer. Once coated onto a conductor and dried, the coating layer is preferably less than 200 microns, more preferably less than 100 microns, most preferably less than 30 microns. But in any event, the thickness is at least 5 microns. The coatings produced in accordance with the present invention are preferably non-white. Coatings appropriate for the present invention are available from Emisshield, Inc. (Blacksburg, Va.).

As used herein, all percentages (%) are percent weight-to-weight, also expressed as weight/weight %, % (w/w), w/w, w/w % or simply %, unless otherwise indicated. Also, as used herein, the terms "wet admixture" refers to relative percentages of the composition of the thermal protective coating in solution and "dry admixture" refers to the relative percentages of the composition of the dry thermal protective coating mixture prior to the addition of water. In other words, the dry admixture percentages are those present without taking water into account. Wet admixture refers to the admixture in solution (with water). "Wet weight percentage" is the weight in a wet admixture, and "dry weight percentage" is the weight in a dry admixture without regard to the wet weight percentages. All percentages mentioned herein are based on dry weight of the total composition, unless otherwise indicated.

The inorganic adhesive is preferably an alkali/alkaline earth metal silicate, which includes, but is not limited to, sodium silicate, potassium silicate, lithium silicate, calcium silicate, and magnesium silicate. The preferred inorganic adhesive is sodium silicate.

The filler is preferably a metal oxide, which includes, but is not limited to, silicon dioxide, aluminum oxide, titanium dioxide, magnesium oxide, calcium oxide, and boron oxide. The preferred filler is silicon dioxide.

The emissivity agent includes, but is not limited to, carbon tetraboride (boron carbide), boron nitride, silicon tetraboride, silicon carbide, molybdenum disilicide, zirconium diboride, cupric chromite, and metallic oxides, such as iron oxides, magnesium oxides, manganese oxides, copper chromium oxides, and chromium oxides, and derivatives thereof. The preferred emissivity agent is boron carbide and/or boron nitride.

The stabilizer includes, but is not limited to, bentonite, kaolin, magnesium alumina silica clay, and stabilized zirconium oxide. Other ball clay stabilizers may be substituted herein as a stabilizer. The preferred stabilizer is bentonite.

The term "total solids" refers to the sum of the silica and the alkali. The weight ratio is a most important silicate variable. Ratio determines the product solubility, reactivity and physical properties. Ratio is either the weight or molar proportion of silica to alkali. Density is an expression of total solids and is typically determined using a hydrometer. As temperatures increase, density decreases. When solids content increases, density increases. The pH is a function of silicate composition and solids concentration. The pH value of silicates does not truly reflect the alkali content of solution, due to the strong buffering capability of silica. This means the pH of a silicate solution is kept constant until almost completely neutralized. The buffering capacity of silicate solutions increases with increasing ratio of silica to alkali.

Emissivity agents are available from several sources. Emissivity is the relative power of a surface to emit heat by radiation, and the ratio of the radiant energy emitted by a surface to the radiant energy emitted by a blackbody at the same temperature. Emittance is the energy radiated by the surface of a body per unit area.

Preferably the stabilizer is bentonite powder, tabular alumina, or magnesium alumina silica clay. The bentonite powder permits the present invention to be prepared and used at a later date. Preparations of the present invention without bentonite powder must be used immediately. Betonite is available, for example, from American Colloid Company (Hoffman Estates, Ill.) as Polargel®.

One or more colorants may be used in the coating composition, preferably at a concentration of about 0.02 to 0.2% (by weight of the total dry composition). The colorant can be organic or inorganic pigments, which includes, but are not limited to, titanium dioxide, rutile, titanium, anatine, brookite, cadmium yellow, cadmium red, cadmium green, orange cobalt, cobalt blue, cerulean blue, aureolin, cobalt yellow, copper pigments, azurite, Han purple, Han blue, Egyptian blue, malachite, Paris green, phthalocyanine blue BN, phthalocyanine green G, verdigris, viridian, iron oxide pigments, sanguine, caput mortuum, oxide red, red ochre, Venetian red, Prussian blue, clay earth pigments, yellow ochre, raw sienna, burnt sienna, raw umber, burnt umber, marine pigments (ultramarine, ultramarine green shade), zinc pigments (zinc white, zinc ferrite), and combinations thereof.

In a preferred embodiment of the present invention, the conductor coating layer contains, in dry weight, about 10% to about 25% sodium silicate, about 55% to about 75% $SiO_2$ dry powder, about 10% to about 25% $B_4C$, optionally about 0.5% to about 5.0% boron nitride dry weight, and about 0.5% to about 2% bentonite powder. The dry composition can be prepared as a wet mixture by adding about 20% to about 40% deionized water on a wet basis.

In a most preferred embodiment of the present invention, the coating used contains, as dry weight percent, about 13% to about 15% sodium silicate, about 69% $SiO_2$ dry powder, about 14% to about 16% boron carbide, and about 1.0% to about 1.5% bentonite powder. That dry composition can be prepared as a wet aqueous mixture having about 36% to about 38% deionized water on a wet basis.

In another most preferred embodiment of the present invention, the coating used contains, as dry weight percent, about 13% to about 15% sodium silicate, about 69% $SiO_2$ dry powder, about 13% to about 15% boron carbide dry weight, about 1.0% to about 2.0% boron nitride dry weight, and about 1.0% to about 1.5% bentonite powder. That dry composition can be prepared as a wet aqueous mixture having about 36% to about 38% deionized water on a wet basis.

Once applied and cured on a conductor, the coating offers a flexible coating that shows no visible cracks when bent on a mandrel of diameter of 10 inches or less. The cured coating is also heat resistant and passes the same mandrel bent test after heat aging at 325° C. for a period of 1 day and 7 days.

FIGS. 1, 2, 3, and 4 illustrate various bare overhead conductors according to various embodiments of the invention incorporating a spectrally selective surface.

Figure 2:
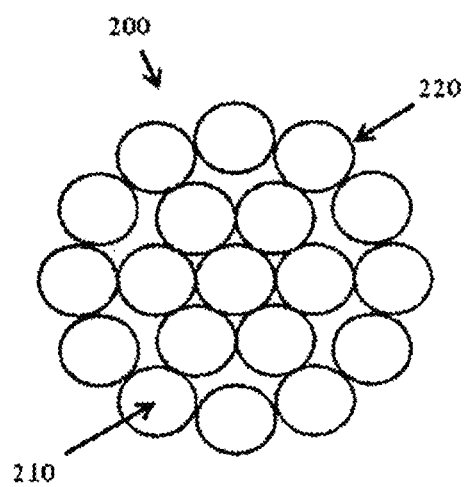
FIG. 2 is a cross sectional view of a conductor in accordance with one embodiment of the present invention.
Figure 3:
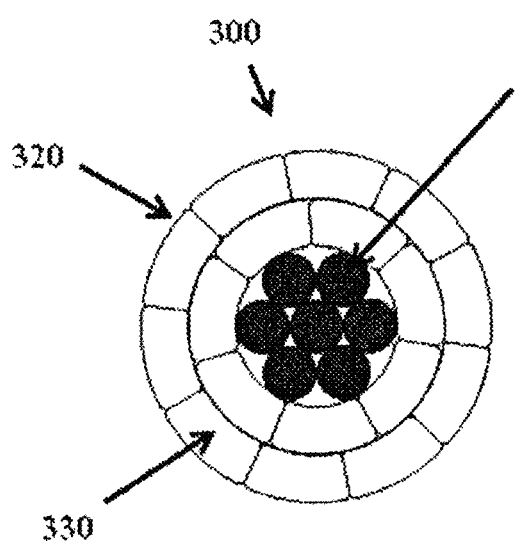
FIG. 3 is a cross sectional view of a conductor in accordance with one embodiment of the present invention.

As seen in FIG. 1, the bare overhead conductor 100 of the present invention generally includes a core of one or more wires 110, round-cross section conductive wires around the core 120, and the spectrally selective surface layer 130. The core 110 may be steel, invar steel, carbon fiber composite, or any other material providing strength to the conductor. The conductive wires 120 are copper, or a copper alloy, or an aluminum or aluminum alloy, including aluminum types 1350, 6000 series alloy aluminum, or aluminum-zirconium alloy, or any other conductive metal. As seen in FIG. 2, the bare overhead conductor 200 generally includes round conductive wires 210 and the spectrally selective surface layer 220. The conductive wires 210 are copper, or a copper alloy, or an aluminum or aluminum alloy, including aluminum types 1350, 6000 series alloy aluminum, or aluminum-zirconium alloy, or any other conductive metal. As seen in FIG. 3, the bare overhead conductor 300 of the present invention generally includes a core of one or more wires 310, trapezoidal shaped conductive wires around the core 320, and the spectrally selective surface layer 330. The core 310 may be steel, invar steel, carbon fiber composite, or any other material providing strength to the conductor. The conductive wires 320 are copper, or a copper alloy, or an aluminum or aluminum alloy, including aluminum types 1350, 6000 series alloy aluminum, or aluminum-zirconium alloy, or any other conductive metal.

Figure 4:
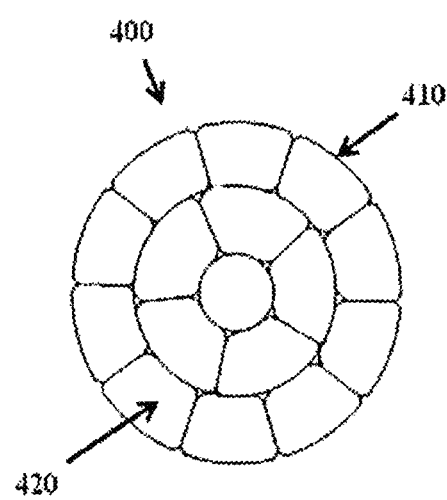
FIG. 4 is a cross sectional view of a conductor in accordance with one embodiment of the present invention.

As seen in FIG. 4, the bare overhead conductor 400 generally includes trapezoidal shaped conductive wires 410 and the spectrally selective surface layer 420. The conductive wires 410 are copper, or a copper alloy, or an aluminum or aluminum alloy, including aluminum types 1350, 6000 series alloy aluminum, or aluminum-zirconium alloy, or any other conductive metal.

The coating composition can be made in a High Speed Disperser (HSD), Ball Mill, Bead mill or using other techniques known in the art. In a preferred embodiment, a HSD is used to make the coating composition. To make the coating composition, the binders, dispersion medium and surfactant (if used) are taken in a High Speed Disperser and a solution is prepared. Into that solution, the heat radiating agent, fillers, stabilizers, colorants and others additives are slowly added. Initially, a lower stirrer speed is used to remove the entrapped air and afterwards the speed is increased gradually up to 3000 rpm. The high speed mixing is performed until the desired dispersion of the fillers and other additives is achieved in the coating.

The dispersion medium can be water or an organic solvent. Examples of organic solvents include, but are not limited to, alcohols, ketones, esters, hydrocarbons, and combinations thereof. The preferred dispersion medium is water. The resulting coating mixture is a suspension with a total solid content of about 40-80%, preferably about 45-55%, more preferably about 49-51%. Upon storage of this mixture, the solid particles may settle, and hence, that coating mixture needs to be stirred and may further be diluted to achieve the required viscosity before transferring in to the coating applicator.

In an embodiment of the present invention, the surface of the overhead conductor is prepared prior to the application of the coating composition. The preparation process can be chemical treatment, pressurized air cleaning, hot water or steam cleaning, brush cleaning, heat treatment, sand blasting, ultrasound, deglaring, solvent wipe, plasma treatment, and the like. In a preferred process, the surface of the overhead conductor is deglared by sand blasting.

The coating mixture composition can be applied by spray gun, preferably with 10-45 psi pressure, which is controlled through the air pressure. The spray gun nozzle is preferably placed perpendicular to the direction of the conductor (at approximately 90° angle) to get a uniform coating on conductor product. In specific cases, two or more guns can be used to get more efficient coatings. The coating thickness and density are controlled by the admixture viscosity, gun pressure, and conductor line speed. During the coating application, the overhead conductor temperature is preferably maintained between 10° C. to 90° C. depending on the material of the conductor.

Alternatively, the coating mixture can be applied to the overhead conductor by dipping or using a brush or using a roller. Here, the cleaned and dried conductor is dipped into the coating mixture to allow the mixture to completely coat the conductor. The conductor is then removed from the coating mixture and allowed to dry.

After application, the coating on the overhead conductor is allowed to dry by evaporation either at room temperature or at elevated temperatures up to 325° C. In an embodiment, the coating is dried by direct flame exposure which exposes the coating to intense, but brief (about 0.1-2 seconds, preferably about 0.5-1 second) heating.

The developed coating can be used for overhead conductors which are already installed and currently being used. Existing conductors can be coated with a robotic system for automated or semi-automated coating. The automated system functions in three steps: 1. cleaning the conductor surface; 2. applying the coating on the conductor surface; and 3. drying the coating.

The surface modification of the present invention can be used in bare overhead conductor accessories and bare overhead conductor electrical transmission and distribution related products and parts for temperature reduction purpose, for example, deadends/termination products, splices/joints products, conductor suspension and support products, and conductor and compression fitting repair parts. These products are commercially available from many manufacturers, such as Preformed Line Products (PLP), Cleveland, Ohio, and AFL, Duncan, S.C.

The coating can be applied to the conductors in several ways. It can be applied by coating the individual wires before their assembly in the bare overhead conductor. Here, it is possible to have all of the wires of the conductor coated, or more economically, only the outer most wires of the conductor coated. Alternatively, the coating can be applied only to the outer surface of the bare overhead conductor. Here, the complete outer surface or a portion thereof can be coated.

Figure 6:
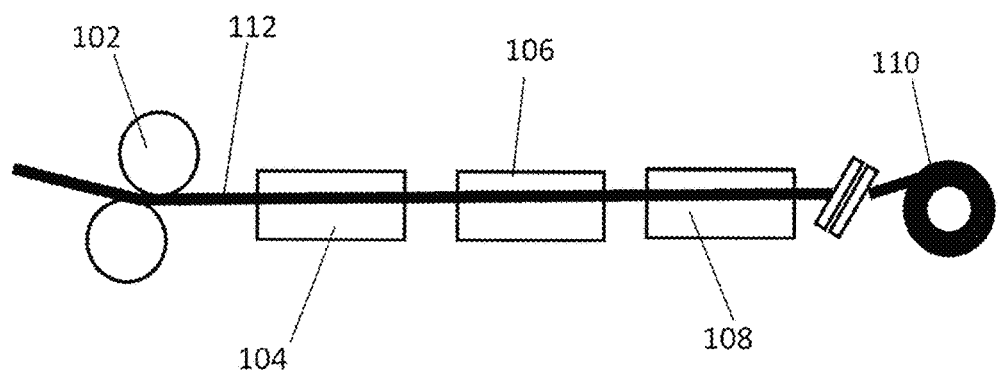
FIG. 6 is a drawing showing a continuous process of the present invention.

The coating can be applied in a batch process, a semi-batch process, or a continuous process. The continuous process is preferred. FIG. 6 illustrates a preferred continuous process for the present invention. After the intake winding roll 102, the conductor 112 is passed through a surface preparation process via a pretreatment unit 104 prior to the coating being applied in the coating unit 106. After the coating is applied, the conductor may be dried via a drying/curing unit 108. Once dried, the cable is wound on a roller 110.

In the pretreatment unit 104, the surface of the conductor 112, is preferably prepared by media blasting. The preferred media is sand, however, glass beads, ilmenite, steel shot, could also be used. The media blasting is followed by air-wiping to blow the particulate materials off the conductor 112. An air-wipe consists of jets of air blown on to the conductor 112 at an angle and in a direction opposing the direction of travel of the conductor 112. The air jets create a 360° ring of air that attaches to the circumference of the conductor 112 and wipes the surface with the high velocity of air. In this case, as the conductor exits the pretreatment unit 104, any particles on the conductor 112 are wiped and blown back into the pretreatment unit 104. The air jet typically operates at about 60 to about 100 PSI, preferably about 70-90 PSI, more preferably about 80 PSI. The air jet preferably has a velocity (coming out of the nozzles) of about 125 mph to about 500 mph, more preferably about 150 mph to about 400 mph, and most preferably about 250 mph to about 350 mph. After the air-wipe, number of particles, that are greater than 10 microns in size, on the surface of the conductor are lower than 1,000 per square feet of the conductor surface, preferably less than 100 per square feet of the surface. After the air wipe, the conductor is preferably heated, e.g. by a heating oven, UV, IR, E-beam, open flame, and the like. The heating can be accomplished by single or multiple units. In a preferred embodiment, the drying/curing occurs by direct flame application. Here, the cable is passed directly through a flame to heat the cable surface to a temperature above ambient temperature. High heating temperature in pretreatment allows for a lower heating temperature later in the drying/curing unit. However, the heating should not be too severe that it affects the quality of the coating (e.g. adherence, evenness, blistering etc.). Here, it is preferable that the conductor not be heated above about 140° C., more preferably no more than about 120° C.

Figure 7:
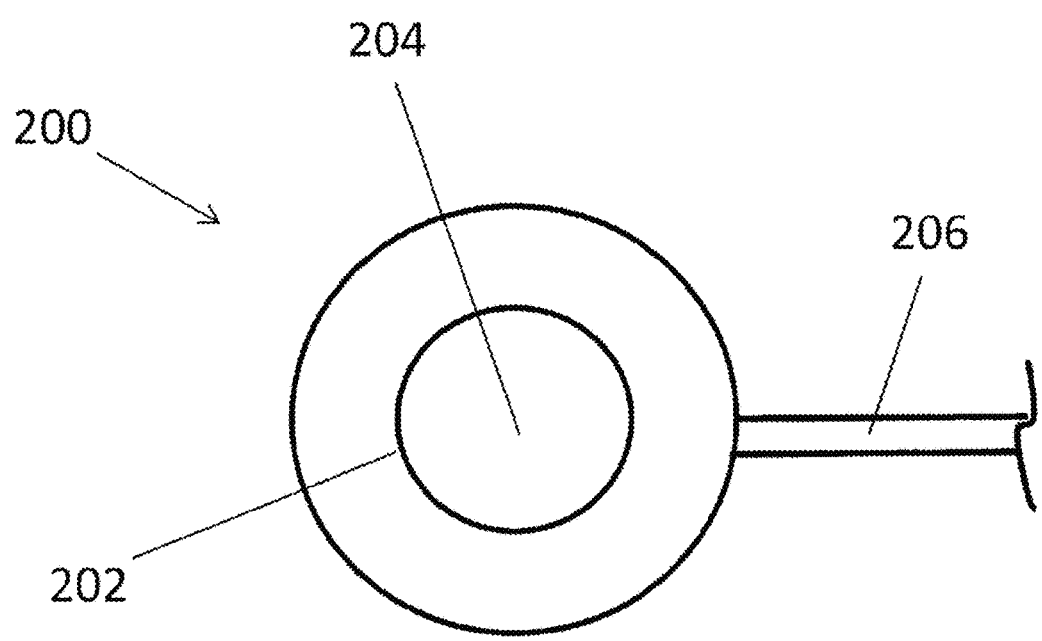
FIG. 7 is drawing showing a cross-section of the flooded die.
Figure 8:
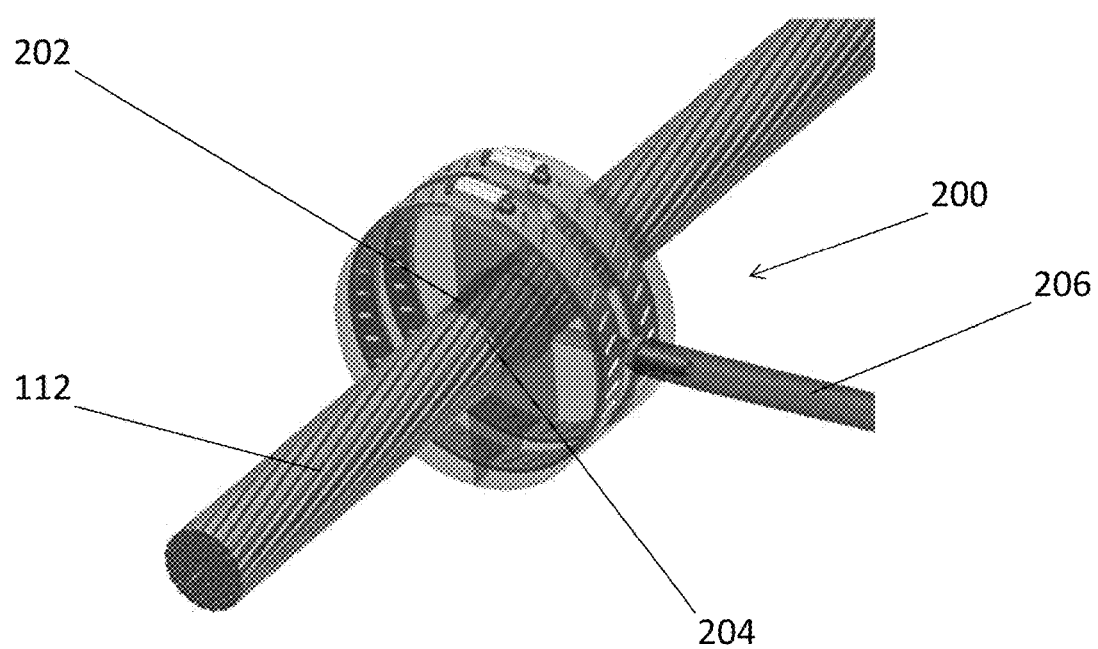
FIG. 8 is a drawing showing a plan view of the flooded die.
Figure 9:
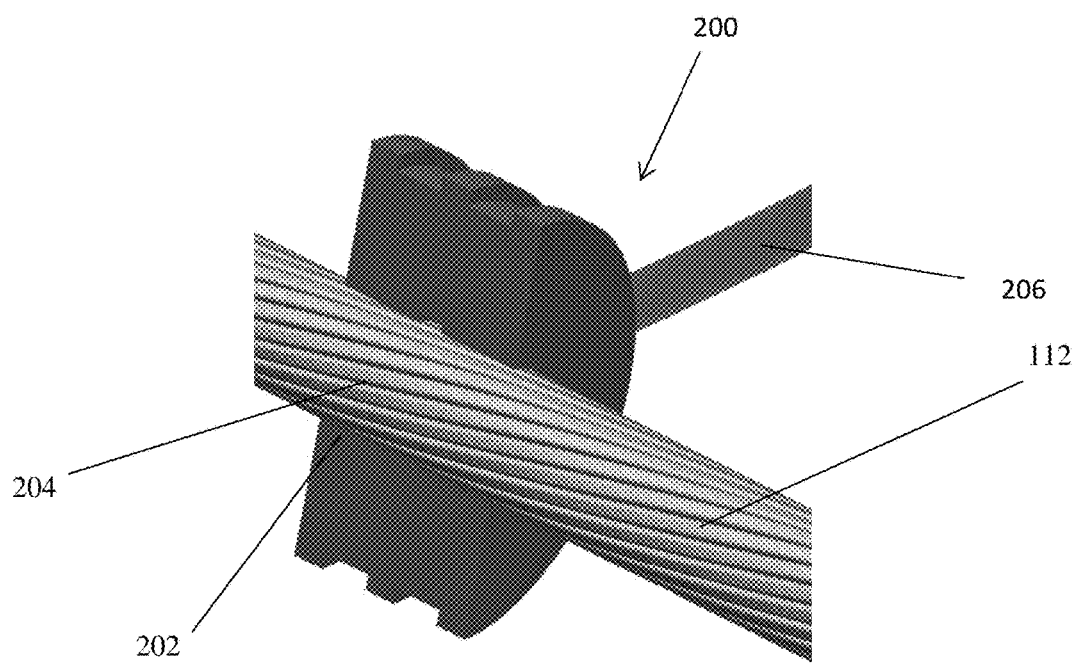
FIG. 9 is a drawing showing a cut-away view of the flooded die.

Once the surface of the conductor 112 is prepared, it is ready for coating. The coating process takes place in the coating unit, where the cable passes through a flooded die that deposits a liquid suspension of the coating onto the prepared surface. FIGS. 7-9 show a depiction of an annular shaped flooded die 200. The coating suspension is fed to the die 200 via a tube 206. As the conductor 112 passes through the center opening 204 of the flooded die 200, the coating suspension coats the conductor 112 via opening ports in the inner surface 202 of the die 200. Preferably, the flooded die 200 contains one or more, preferably two or more, more preferably four, opening ports evenly spaced around the circumference of the inner surface 202. Once the conductor 112 exits the flooded die, it then passes through another air wipe to remove excess coating suspension and to spread the coating evenly around the conductor. In the case of a stranded conductor, the air wipe allows the coating to penetrate the grooves between the strands on the surface of the conductor. This air wipe preferably operates at the same condition as that for the air wipe in the pretreatment unit 104.

Once the conductor 112 is coated, it passes through the drying/curing unit 108. The drying/curing can be accomplished by air or by using hot air of the temperature of up to 1000° C. and/or the line speed of between about 9 feet/min to about 500 feet/min, preferably about 10 feet/min to about 400 feet/min, depending on the metal alloy used in the conductor. The drying process may be gradual drying, rapid drying, or direct flame application. The drying or curing also can be accomplished by other techniques, like a heating oven, UV, IR, E-beam, chemical, or liquid spray and the like. The drying can be accomplished by single or multiple units. It also can be vertical or horizontal or at a specific angle. In a preferred embodiment, the drying/curing occurs by direct flame application. Here, the cable preferably passes directly through a flame to heat the cable surface to a temperature of up to about 300° C., preferably up to about 150° C. Once dried/cured, the coated conductor is wound on a roller 110 for storage.

The continuous process, if operated for an individual strand (instead of the whole cable), preferably operates at a line speed of up to about 2500 ft/min, preferably about 9 to about 2000 ft/min, more preferably about 10 to about 500 ft/min, most preferably about 30 to about 300 ft/min.

The overhead conductor coating of the present invention can be used in composite core conductor designs. Composite core conductors are used due to their lower sag at higher operating temperatures and higher strength to weight ratio. Reduced conductor operating temperatures due to the coating can further lower sag of the conductors and lower degradation of polymer resin in the composite. Examples for composite cores can be found, e.g., in U.S. Pat. Nos. 7,015,395, 7,438,971, and 7,752,754, which are incorporated herein by reference.

The coated conductor exhibits improved heat dissipation. Emissivity is the relative power of a surface to emit heat by radiation, and the ratio of the radiant energy emitted by a surface to the radiant energy emitted by a blackbody at the same temperature. Emittance is the energy radiated by the surface of a body per unit area. Emissivity can be measured, for example, by the method disclosed in U.S. Patent Application Publication No. 2010/0076719 to Lawry et al., which is incorporated herein by reference.

Without further description, it is believed that one of ordinary skill in the art can, using the preceding description and the following illustrative examples, make and utilize the compounds of the present invention and practice the claimed methods. The following example is given to illustrate the present invention. It should be understood that the invention is not to be limited to the specific conditions or details described in this example.

EXAMPLE

Eleven (11) coating compositions (Exp 1, Exp 2, Exp3, Exp4, Exp 5, Exp 6, Exp 7, Exp 8, Exp 9, Exp 10, and Exp 11) were made. Exp 1 contains dry admixture of 13-15% sodium silicate, 68-69% silicon dioxide powder, 14-16% boron carbide, and 1-1.5% bentonite powder.

Exp 2 contains 13-15% sodium silicate, 68-69% silicon dioxide powder, 13-15% boron carbide, 1-2% boron nitride, and 1-1.5% bentonite powder.

Exp 3-7 contains B4C dry powder weight 12-17%, SiO2 dry powder weight 60-70%, Poly-silicate powder dry weight basis 15-20%, DI water on a wet weight basis of 20-25%. The total solids content is approximately 50%.

Exp 8-11 are consists of B4C dry powder weight of 10-15%, TiO2 powder dry weight of 7-13%, diatomaceous earth powder dry weight of 1-5%, acrylic polymer dry weight 30-40% and DI water on a wet weight basis of 30-50%. The total solids content is approximately 50%.

The above mentioned compositions are coated on sample substrates and cured. The final thickness of the coating is approximately 1 mil.

Figure 5:
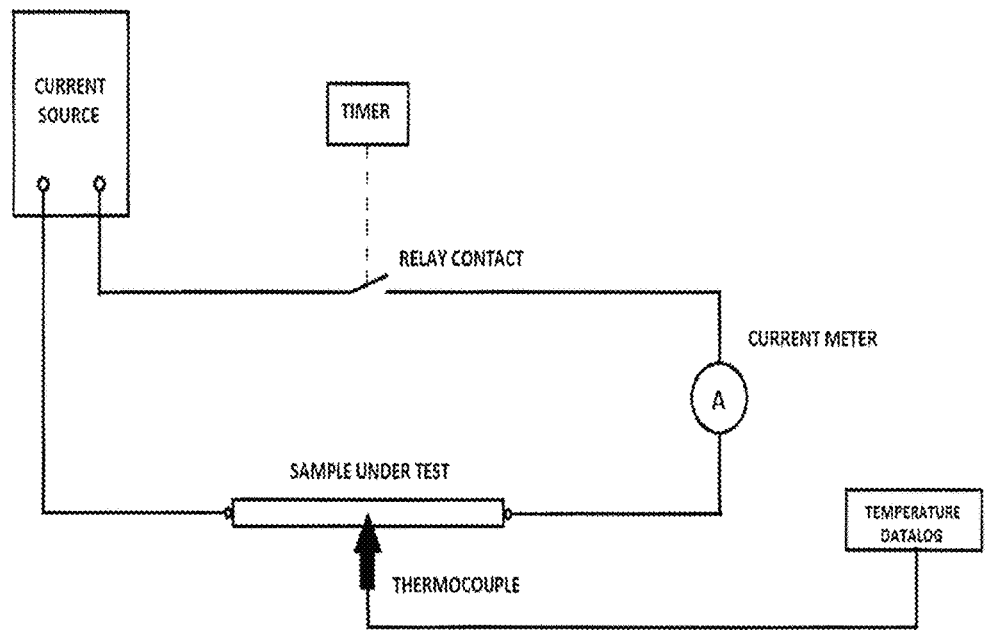
FIG. 5 is a drawing showing the test arrangement to measure the temperature of metal substrates for a given applied current.

The coated substrates are then tested for temperature reduction. A current is applied through the metal substrate with a 1 mil coating thickness and an uncoated metal substrate to measure the performance improvement of the coating. The test apparatus is shown in FIG. 5 and mainly consisted of a 60 Hz ac current source, a true RMS clamp-on current meter, a temperature datalog device and a timer. Testing was conducted within a 68" wide×33" deep windowed safety enclosure to control air movement around the sample. An exhaust hood was located 64" above the test apparatus for ventilation.

The sample to be tested was connected in series with an ac current source through a relay contact controlled by a timer. The timer was used to activate the current source and controlled the time duration of the test. The 60 Hz ac current flowing through the sample was monitored by a true RMS clamp-on current meter. A thermocouple was used to measure the surface temperature of the sample. Using a spring clamp, the tip of the thermocouple was kept firmly in contacted with the center surface of the sample. In case of measurement on coated sample, the coating was removed at the area where thermocouple made the contact with the sample to get accurate measurement of the temperature of the substrate. The thermocouple temperature was monitored by a datalog recording device to provide a continuous record of temperature change.

Both coated cable samples were tested for temperature rise on this test set-up under identical experimental conditions. The current was set at a desired level and was monitored during the test to ensure a constant current is flowing through the samples. The timer was set at a desired value and the temperature datalog recording device was set to record temperature at a recording interval of one reading per second.

The metal component for the uncoated and coated samples was from the same source material and lot of Aluminum 1350. The finished dimensions of the uncoated sample were 12.0"(L)×0.50"(W)×0.027"(T). The finished dimensions of the coated samples were 12.0"(L)×0.50"(W)×0.029"(T). The increase in thickness and width was due to the thickness of the applied coating.

The temperature test data was then accessed from the datalog device and analyzed using a computer. The temperature (measured in ° C.) of the coated samples as compared to uncoated sample are reported as % reduction relative to uncoated sample are shown in Tables 1 and 2.

TABLE 1

| 130 AMPS for 15 MINS | Temperature Reduction over Uncoated Conductor (%) | | | | | | |
|---|---|---|---|---|---|---|---|
| | Exp 1 | Exp 2 | Exp 3 | Exp 4 | Exp5 | Exp 6 | Exp7 |
| Electrical | 27.8% | 28.0% | 26.2% | 31.1% | 31.1% | 25.3% | 32.8% |

TABLE 2

| 130 AMPS for 15 MINS | Temperature Reduction over Uncoated Conductor(%) | | | |
|---|---|---|---|---|
| | Exp 8 | Exp 9 | Exp 10 | Exp 11 |
| Electrical | 19.0% | 24.0% | 23.0% | 24.0% |

Heat aging performance of the coating was carried out by placing the coated samples in an air circulating oven maintained at 325° C. for a period of 1 day and 7 days. After the heat aging was complete, the samples were placed at room temperature of 21° C. for a period of 24 hours. The samples were then bent on different cylindrical mandrels sized from higher diameter to lower diameter and the coatings were observed for any visible cracks at each of the mandrel size. The samples are bent on mandrels of diameters of 10 inches and less. The samples are reported "Pass" at the smallest mandrel size where no visible cracks are visible. The file hardness test was performed by running a series of files of known hardness over the coating. If coating is not removed by the file, then that coating is harder than the file. Six different files were used, varying from HRC40 to HRC65 hardness with HRC65 being the hardest and HRC 40 being the softest. The tape adhesion test was performed as specified by ASTM D3359-09. The mandrel bend test, file hardness test, and the tape adhesion test results are shown in Tables 3-5. The inventive composition showed the balance superior properties of flexibility, hardness, and tape adhesion retention before and after heat aging.

TABLE 3

| Properties of Coated Conductors before heat aging | | | | | | |
|---|---|---|---|---|---|---|
| EXP 1 | EXP 2 | EXP 3 | EXP 4 | EXP 5 | EXP 6 | EXP 7 |
| Mandrel Bend Test | | | | | | |
| Pass @ 3" mandrel | Pass @ 4" mandrel | Pass @ 9" mandrel | Pass @ 9" mandrel | Pass @ 9" mandrel | Pass @ 7" mandrel | Pass @ 7" mandrel |

TABLE 3-continued

Properties of Coated Conductors before heat aging

| EXP 1 | EXP 2 | EXP 3 | EXP 4 | EXP 5 | EXP 6 | EXP 7 |
|---|---|---|---|---|---|---|
| File Hardness Test ||||||||
| HRC-65+ | HRC-50 | HRC-50 | HRC-55 | HRC-45 | HRC-65 | HRC-50 |
| Tape Adhesion Test |||||||
| 0% | 0% | 0% | 5-15% | 15-35% | 0% | 0% |

TABLE 4

Properties of Coated Conductors after heat aging

| EXP 1 | EXP 2 | EXP 3 | EXP 4 | EXP 5 | EXP 6 | EXP 7 |
|---|---|---|---|---|---|---|
| Mandrel Bend Test |||||||
| Pass @ 4" mandrel | Pass @ 7" mandrel | Pass @ 7" mandrel | Pass @ 9" mandrel | Pass @ 9" mandrel | Pass @ 7" mandrel | Pass @ 6" mandrel |
| File Hardness Test |||||||
| HRC-65+ | HRC-50 | HRC-50 | HRC-65 | HRC-50 | HRC-65+ | HRC-65+ |
| Tape Adhesion Test |||||||
| 0% | 5-15% | 0% | 5-35% | 15-15% | 0% | 0% |

While particular embodiments have been chosen to illustrate the invention, it will be understood by those skilled in the art that various changes and modifications can be made therein without departing from the scope of the invention as defined in the appended claims.

What is claimed is:

1. A method of forming an improved overhead conductor having a lower operating temperature, the method comprising:
   a. pretreating the outer surface of a bare conductor to prepare the outer surface for coating by removing particulates greater than 10 microns in size, such that less than 1000 particulates per square feet are present on the outer surface of the bare conductor, wherein the pretreating includes sandblasting the outer surface of the bare conductor, and applying an air wipe to the outer surface of the bare conductor subsequent to the step of sandblasting, wherein the step of applying the air wipe comprises applying a jet of air around the circumference of the bare conductor at an angle of 360 degrees and in a direction opposing the direction of travel of the bare conductor;
   b. applying a surface coating to the outer surface of the bare conductor, wherein the surface coating comprises 45% to 55% solid content, and the solid content comprises about 5% to about 30% of an inorganic adhesive, about 45% to about 92% of a filler, and about 2% to about 20% of one or more emissivity agents; and
   c. drying the surface coating to form a coating layer on the outer surface of the bare conductor having a thickness from about 5 microns to about 30 microns; and
   wherein the method is continuous.

2. The method of claim 1, wherein the surface coating further comprises a stabilizer, and wherein the surface coating comprises 50% solid content, and the solid content comprises about 13% to about 15% sodium silicate, about 68% to about 69% silicon dioxide powder, about 14% to about 16% boron carbide, and about 1% to about 1.5% bentonite powder.

3. The method of claim 1, wherein the surface coating further comprises a stabilizer, and wherein the surface coating comprises about 50% solid content, and the solid content comprises about 13% to about 15% sodium silicate, about 68% to about 69% silicon dioxide powder, about 13% to about 15% boron carbide, about 1.0% to about 2.0% boron nitride, and about 1% to about 1.5% bentonite powder.

4. The method of claim 1, wherein the inorganic adhesive comprises one or more of sodium silicate, potassium silicate, lithium silicate, calcium silicate, and magnesium silicate.

5. The method of claim 1, wherein the filler comprises one or more of silicon dioxide, aluminum oxide, titanium dioxide, magnesium oxide, calcium oxide, and boron oxide.

6. The method of claim 1, wherein the emissivity agent comprises one or more of carbon tetraboride, boron nitride, silicon tetraboride, silicon carbide, molybdenum disilicide, zirconium diboride, cupric chromite, iron oxide, magnesium oxide, manganese oxide, copper chromium oxide, and chromium oxide.

7. The method of claim 1, wherein the bare conductor comprises one or more conductive wires formed from one or more of copper, copper alloy, aluminum, aluminum alloy, and aluminum-zirconium alloy.

8. The method of claim 1, wherein the step of pretreating of the outer surface further comprises applying heat not above about 140° C. to the outer surface subsequent to the step of applying the air wipe.

9. The method of claim 1, wherein the step of drying the surface coating comprises heating the outer surface from room temperature to about 325° C.

10. The method of claim 9, wherein the outer surface is heated to a temperature from room temperature to about 150° C.

11. The method of claim 9, wherein the step of heating to the outer surface is applied by direct flame for a period of about 0.1 second to about 2 seconds.

12. The method of claim 1, wherein the step of applying the surface coating occurs in a flooded die or a spray gun.

13. The method of claim 12, wherein the flooded die comprise an annular shaped portion with a center opening through which the bare conductor passes.

14. The method of claim 12, wherein the flooded die further comprises a tube for directing the surface coating to the die and onto the bare conductor.

15. The method of claim 12 wherein the flooded die further comprises one or more opening ports through which the surface coating passes from the flooded die and is deposited onto the outer surface of the bare conductor.

16. The method of claim 1, wherein the solid content further comprises about 1% to about 5% of a stabilizer.

17. A method of pretreating the outer surface of a bare conductor for deposition of a surface coating, the method comprising:
   a. sandblasting the outer surface of a bare conductor; and
   b. applying an air wipe to the outer surface of the bare conductor, wherein the step of applying the air wipe comprises applying a jet of air around the circumference of the bare conductor at an angle of 360 degrees and in a direction opposing the direction of travel of the bare conductor, wherein particulates greater than 10 microns in size are removed such that less than 1000 particulates per square feet are present on the outer surface of the bare conductor; and
   wherein the method is continuous.

* * * * *